(12) United States Patent
Parosa

(10) Patent No.: US 8,197,768 B2
(45) Date of Patent: Jun. 12, 2012

(54) APPARATUS FOR CONVERSION OF MATERIALS INCLUDING ASBESTOS

(75) Inventor: Ryszard Parosa, Wroclaw (PL)

(73) Assignee: Aton-HT S.A., Wroclaw (PL)

( * ) Notice: Subject to any disclaimer, the term of this patent is extended or adjusted under 35 U.S.C. 154(b) by 1051 days.

(21) Appl. No.: 12/115,333

(22) Filed: May 5, 2008

(65) Prior Publication Data

US 2008/0207979 A1    Aug. 28, 2008

Related U.S. Application Data

(63) Continuation of application No. PCT/PL2006/000075, filed on Nov. 2, 2006.

(30) Foreign Application Priority Data

Nov. 3, 2005  (PL) .......................................... 377957

(51) Int. Cl.
*B01J 19/08* (2006.01)
(52) U.S. Cl. ........................................ 422/186; 422/286
(58) Field of Classification Search .................. 422/186, 422/286, 287; 588/410, 411, 254, 261, 900
See application file for complete search history.

(56) References Cited

U.S. PATENT DOCUMENTS 5,683,484 A * 11/1997 Pieper et al. .................. 65/134.5

FOREIGN PATENT DOCUMENTS

| DE | 195 26 495 A1 | 3/1996 |
| DE | EP 1 588 783 A | 10/2005 |
| WO | WO 91/00123 A | 1/1991 |

OTHER PUBLICATIONS

PCT/PL2006/000075, PCT Preliminary Report on Patentability; Date of Mailing Nov. 12, 2007.
PCT/PL2006/000075, PCT International Search Report and the Written Opinion of the International Searching Authority; Date of Mailing Apr. 20, 2007.
PCT/PL2006/000075, PCT Written Opinion of the International Searching Authority; Date of Mailing Feb. 11, 2006.

* cited by examiner

*Primary Examiner* — Edward Johnson
(74) *Attorney, Agent, or Firm* — Brinks Hofer Gilson & Lione

(57) ABSTRACT

A method of heating asbestos containing materials and changing their structure from crystal fibrous to that deprived of fiber structure using an electromagnetic field is provided and is characterized by crumbling of utilized material. Crumbled material is being transported to microwave reactor. During transportation and the crumbling process, material chunks are being mixed with a heating facilitating agent. The device includes a utilized materials' crusher (1), crumbled material chunks's worm (2), heating facilitating agent's feeder (3) and microwave thermal reactor (4). The feeder (3) is adjoined to the crusher (1) and/or to the worm (2). The reactor (4) has a heating chamber (9) made of materials that do not absorb microwave radiation which is located at the transporter's (2) outlet.

Figure 1:
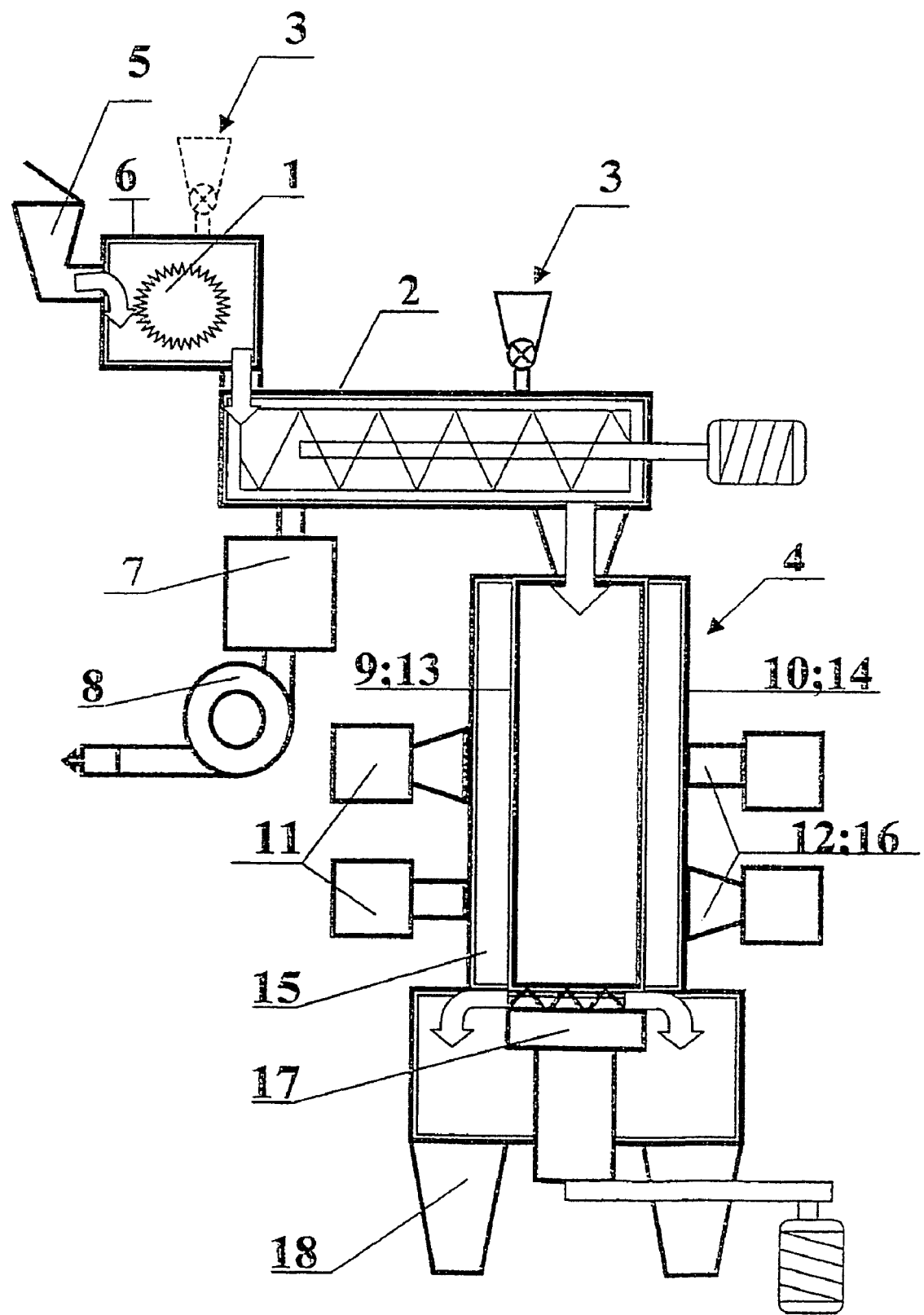

20 Claims, 3 Drawing Sheets

APPARATUS FOR CONVERSION OF MATERIALS INCLUDING ASBESTOS

CROSS-REFERENCE TO RELATED APPLICATIONS

This application is a continuation of International Application No. PCT/PL2006/000075 filed on Nov. 2, 2006, which claims the benefit of P 377957, filed Nov. 3, 2005 The disclosures of the above applications are incorporated herein by reference.

FIELD

The present invention concerns a method for conversion of materials including asbestos as well as an apparatus for conversion of materials including asbestos designed, first of all, for rendering harmless dismantled building elements, in particular cement-asbestos plates.

BACKGROUND

The statements in this section merely provide background information related to the present disclosure and may not constitute prior art.

The known method for rendering harmless fibrous building materials, like asbestos, which comprises heating it till it reaches the temperature of about 1400° C., close to its melting temperature, by contacting it with fumes of a traditional furnace. As a result, asbestos fiber meltdown and fading of its crystal structure takes place and asbestos is transformed into a safe non-fibrous structure.

An example of the traditional method can be found in the international patent application published as WO 91/00123. It discloses a process for the mineralogical conversion of waste asbestos to a non-asbestos product. The waste asbestos is treated with a mineralizing agent and then heated for a period of time sufficient to convert the asbestos to the non-asbestos product. The mineralizing agent is preferably a water-soluble alkali metal borate or alkali metal silicate.

The process of heating is carried out in a conventional oven until the material achieves a temperature above 2000° F. Due to isolation properties of some materials containing asbestos, there is needed a long time of heating such materials. For this reason, energy outlay to effectively utilize (making harmless) asbestos is very large. Introduction of additional substances in WO 91/00123 has as its aim to boost the asbestos fibres destruction as the result of thermochemical processes. The publication presents only laboratory examples which illustrates the difficulties to adapt the disclosed process to commercial applications in the industrial scale.

A German patent specification DE 19526495 A discloses another method and a device designed for thermal modification of building materials, mainly asbestos, binded during creation of hydrates. This method comprises treating fibrous materials with microwave radiation inside a processing chamber, with wave length ranging from 10-1 m to 10-6 m, whereas at least a part of the radiation fits into a range of maximum absorption, as a result the materials are heated so much that their fibrous structure disintegrates.

The processed material is introduced inside the chamber in portions and heated up to the desired temperature in a certain time dependant on radiation power. A device for realizing such a method has a processing chamber to which a microwave generator is attached having at least one radiator emitting microwave radiation. The processing chamber has a loading inlet and an unloading outlet which are close by sealing gates, and the whole device has a special shield preventing the microwave energy spreading. Placing radiators opposite to each other, as well as rotating the processed material, is very advantageous. At least one radiation beam penetrates into the processing chamber of the device, the said beam emitted by parabolic antennas and directed crosswise to the chamber axis. Another embodiment of such a device comprises a container with a processing zone, across which the processed material is moved. A microwave generator with a radiator is connected to the container, said radiator creating microwave radiation in the processing area. Processing chamber has an inlet and an outlet through which processing material is being inserted and taken out. Both inlet and outlet are closed by air locks and the whole device has a protective shield.

Because materials containing asbestos poorly absorb microwave radiation, maximum absorption during their processing can be reached only within a narrow range of microwave length and frequency. Effective heating of materials, merged as a result of the creation of hydrates, is achieved by the use of radiation in the band of so called polar molecule chemically bounded resonant absorption. It corresponds to a frequency of over 4 GHz, and infrared radiation. In industrial practice it is permitted to use microwave generators with frequencies 2.45 GHz and 915 MHz, which correspond to wave length 12, 24 centimeters and 32.77 centimeters accordingly. Of course, in case of need one can use generators with other, optimally selected, frequencies and respectively bigger power; however they are very expensive and almost inaccessible. Moreover, the temperature of about 1400° C., which is necessary to disintegrate the fibrous structure of asbestos, with known methods of its thermal processing, requires huge amounts of energy. Additionally, radiators in the form of parabolic antennas, used with generators of the known device, can be used only for emitting the non-polarized microwave field. Placing radiators opposite to each other brings only partial success, because the maximum field intensity has a local range. Due to this fact we can obtain an effective heating only in a small area of the converted material. A significant disadvantage of non-polarized radiation is a risk of harmful coupling between generators having radiators situated opposite to each other. This effect of generator coupling can become even more serious when the emitted electromagnetic waves reach a frequency at which there is weak field absorption by the processed material.

In practice, the method acc. to DE 19526495 A cannot be used, as one cannot use the microwave generators for frequencies different than approved for industries, i.e. 2450 MHz and 915 MHz, among others. Further, high power generators for frequencies above 3 GHz are difficult to obtain and very expensive—they are used only in scientific research.

The European Patent Application EP 1 588 783 teaches a process for inactivating industrial waste including crystalline or semi-crystalline material containing $H_2O$ or crystal water, which consists in subjecting the industrial wastes to high power microwaves to explosive like convert the $H_2O$ or crystal water into the vapor phase and to destroy its solid state structure.

It teaches also an apparatus having generally a chamber with input, output and conveying means, and a microwave source. It does not disclose any specific method as such nor a definite construction of an apparatus, so it is not suitable for the direct industrial application. It is taught there that the material should not be crumbled and its subject matter consists on strong local overheating ("hot spot"). Strong local overheatings cause uneven heating of the material. As the result, some part are having lower temperature and they do not react sufficiently (some areas with fibrous asbestos structure may remain).

It is equally important, that by the methods acc. to DE 19526495 A and EP 1 588 783 it is not possible to make harmless the asbestos contained in asbestos cloth, asbestos ropes or different asbestos boards, as such waste do not contain water or watery silicon compounds.

SUMMARY

A method for conversion of materials including asbestos comprising heating them and transforming the fibrous crystalline structure of asbestos into non-fibrous structure under influence of electromagnetic field, according to the disclosure, is characterized by the fact that converted material is crumbled and then the crumbled material is transported into a microwave reactor, whereas material particles, while being crumbled and/or transported, are mixed with an agent facilitating their heating, and after their introduction into the reactor material particles are heated up to temperature of their structural transformation by way of many polarized beams of focused electromagnetic radiation in microwave band, with frequency from about 300 MHz to about 3,000 MHz and then the product of the thermal processing is removed from the reactor, cooled and is subjected to the process of final crumbling.

Converted material is crumbled into particles with dimensions not exceeding about 5 mm. Material particles while being crumbled are mixed with sodium tetra boron water solution or with sodium hydroxide, whereas during the transportation phase chunks of materials are being mixed with sodium silicate water solution or with potassium silicate water solution. The most beneficial effect is obtained when material particles are mixed with an agent facilitating their heating in volume proportion from about 3:1 to about 1:1. In order to transform fibrous, crystal asbestos structure into a non-fibrous one, material particles mixed with an agent facilitating their heating are heated up to temperature from about 900° C. to about 1,100° C. and kept in such temperature for a period of time lasting from about 2 to about 15 minutes.

An apparatus for conversion of materials including asbestos equipped with a thermal reactor including a heating chamber having at least one microwave generator, according to the disclosure, is characterized by the fact that it comprises a crusher for converted material, a conveyor for particles of the crumbled material, a feeder/dispenser of the agent facilitating heating and a thermal microwave reactor, whereas the feeder is connected to the crusher and/or to the conveyor, and the reactor heating chamber, made of microwave radiation non-absorbing material, is located at an outlet of the conveyor and placed in a metal housing, whereas a microwave generator unit with microwave radiators is fixed to the metal housing.

In a beneficial solution of the disclosure, the feeder is attached to the crusher or simultaneously to the crusher and to the conveyor. In another beneficial solution, the feeder is attached only to the conveyor. The heating chamber and the housing of the reactor have both forms of stationary vertical cylinders situated coaxially, between which an insulating space is created, and microwave generators are placed on a circumference of the housing, the said microwave generators having radiators emitting polarized waves, whereas radiators located opposite to each other emit polarized waves with mutually perpendicular polarization.

The radiators in one form have advantageously the form of flattened tubes. It is preferred if the crusher, provided for the process of final crumbling of the product of the thermal processing, is located underneath the heating chamber of reactor. In the another form, the heating chamber and the reactor housing both have horizontally shaped, coaxially situated, cylinders between which an insulating space is created, whereas the heating chamber is mounted on rotary bearings in the housing and connected to the driving source, and microwave generators are located in series along the housing and have radiators emitting polarized waves.

Although the materials that include asbestos have low heat conductivity, thanks to their crushing and mixing with a supporting agent, their capacity for the absorption of microwave radiation is significantly increased. Also materials free from hydrates obtain this beneficial feature. Under the influence of focused action of many polarized beams of radiation, one receives a fast and uniform heating of material in all its volume. The additional effect of using an agent facilitating the heating allows for lowering of the temperature, at which the transformation of fibrous, crystalline structure of asbestos into a harmless structure without fibers takes place. As a result, the process of a microwave heat treatment requires relatively small quantities of electric energy. Apart from the kind of absorption and the composition of the utilized material the device may be equipped, according to the disclosure, by microwave generators with a working frequency of about 2.45 GHz or about 915 MHz.

Thanks to flat tube radiators, which produce polarized beams of radiation, it is possible to avoid harmful coupling between generators and also obtain a relatively large concentration of microwave energy.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

Figure 2:
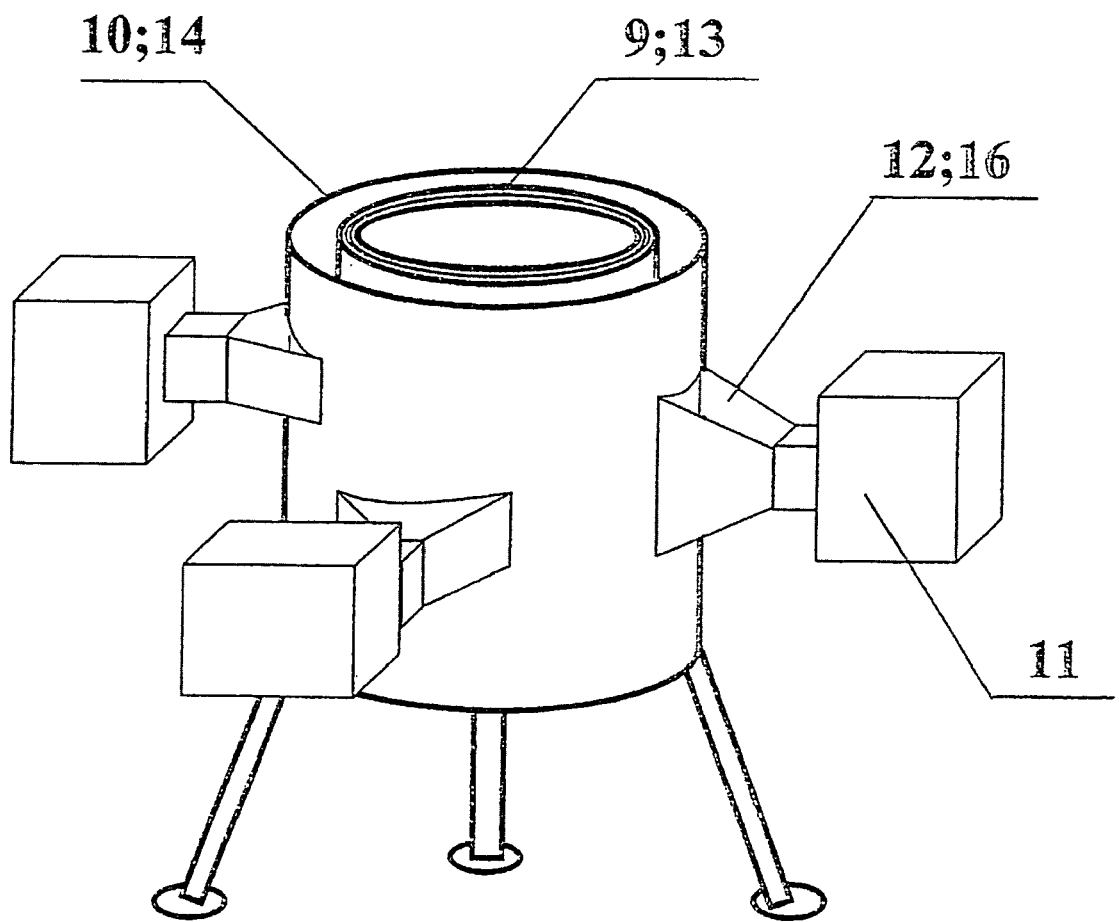
Figure 3:
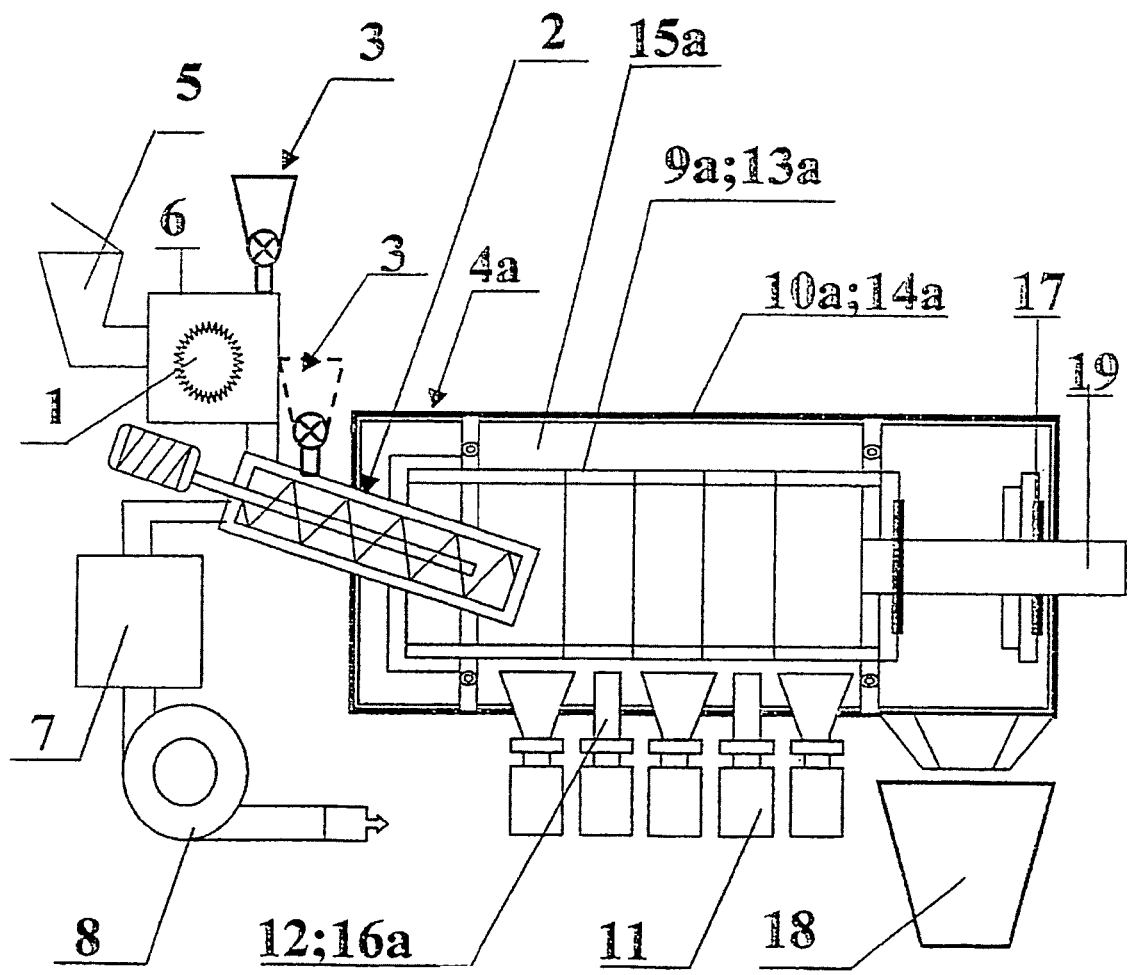

In order that the invention may be well understood, there will now be described forms thereof, given by way of example, reference being made to the accompanying drawings, in which:

FIG. 1 is a side view of a device for heating and destruction of the asbestos fibres, constructed in accordance with the principles of the present disclosure, owing to the crumbling of the material to the required size, soaking it with chosen additives and as a result of its heating by focused and polarised microwaves, takes place quickly and independently of the composition of waste containing asbestos;

FIG. 2 is a side view of a device for effectively using available microwave generators emitting microwaves with approved (for the industrial applications) frequencies of about 2,450 MHz and about 915 MHz constructed in accordance with the principles of the present disclosure; and FIG. 3 is a side view of a device for reducing the energy outlay for destruction of the asbestos fibres constructed in accordance with the principles of the present disclosure.

DETAILED DESCRIPTION

The following description is merely exemplary in nature and is not intended to limit the present disclosure, application, or uses.

The subject of the disclosure in the form of an apparatus for conversion of materials including asbestos is presented in an exemplary form in a drawing in which FIG. 1 presents a simplified representation of a vertical section of the device, having a microwave reactor with a stationary, vertical heating chamber. FIG. 2 presents a perspective view of the reactor from FIG. 1, and FIG. 3 presents a simplified representation of the device, having reactor with a rotary, horizontal heating chamber.

The apparatus according to the disclosure presented in the FIGS. 1 and 2 is basically composed of a hammer crusher 1, a screw conveyor 2, a feeder 3 and a thermal microwave reactor 4, which constitute the working installation.

A loading inlet 5 and a body 6 of the crusher 1 are sealingly closed, which prevents released asbestos fibers from getting through to the environment. The feeder 3 is attached to the conveyor 2 and supplies it with the agent that facilitates heating particles of the crushed material. As needed, the feeder 3 is attached simultaneously to both the crusher 1 and conveyor 2 or is attached only to the crusher 1. The conveyor 2 also has also a function of a mixer for producing a uniform mixture of particles of the crushed material and the agent that facilitates its heating. The body of the conveyor 2 is connected by a dust filter 7 with an exhaust fan 8. The chamber 9 is mounted in a metal housing 10, which protects the environment against the influence of unwanted microwave radiation. A set of four microwave generators 11, equipped with four microwave radiators 12, is fixed to the housing 10. The chamber 9 and the housing 10 both have a form of stationary, basically pipe like, cylinders 13 and 14, which are placed vertically and situated coaxially to each other. Between the cylinders 13, 14 there is created a vertical, annular insulation space 15, which—depending on the need—is filled with air or with a layer of the thermal insulation material, which is not shown in the drawing. The microwave generators 11 are uniformly displaced along the circumference of the housing 10 and their radiators 12 have a form of tubes 16 with flattened outlets. When a flattened outlet of one horn 16 is directed horizontally then the flattened outlet of the opposite horn 16 is directed vertically. The radiators 12 situated opposite to each other emit polarized waves with mutually perpendicular polarizations. Under the heating chamber 9 there is a disk crusher 17, which serves as a crusher of the product of heat treatment, the said product having a form that is similar to pumice. The horizontal disk of the crusher 17 constitutes the closing of the chamber outlet 9. The body of the crusher 17 has a connection to an air or water cooling system that is not presented, and is equipped with containers 18 for collecting the crushed final product. Another form of the apparatus according to the disclosure is presented on the FIG. 3. It also comprises the crusher 1 with the loading inlet 5 a screw conveyor 2, a feeder 3 and a thermal microwave reactor 4a, whereas the filter 7 and the fan 8 are attached to the conveyor 2. The heat resistant, ceramic heating chamber 9a and a metal housing 10a of the reactor 4a both have the form of basically pipe like cylinders 13a and 14a, which are placed horizontally and situated coaxially to one another. Between the cylinders 13a and 14a there is a horizontal, annular insulation space 15a that is filled by air. The heating chamber 9a, in the form of a rotary drum, is mounted in a stationary housing 10a and connected to the drive 19, whereas the outlet of the conveyor 2 is introduced inside the chamber 9a. In the end part of the housing 10a of the reactor 4a there is a rotary fan crusher 17a, whereas at the outlet of the housing there are placed the containers 18a for the crushed final product. The microwave generators 11 are placed in series along the lower part of the housing 10a and have the radiators 12 in form of tubes 16a with flattened outlets. The radiators 12 emit polarized waves with mutually perpendicular polarizations.

During the work of the apparatus shown in the FIG. 1 and FIG. 2, elements containing asbestos are placed in the crusher 1 inlet 5. For example, cement-asbestos plates, asbestos-gypsum plates, asbestos blankets and asbestos cords, which are crushed into small particles of diameters not exceeding 5 millimeters. During conversion of cement-asbestos plates, called popularly asbestic tiles, all the crushed material is mixed, already in the crusher 1, with sodium tetra boron water solution or with constant sodium hydroxide, brought from the feeder 3, in proportions of about 2:1 or about 1:1. Wet particles fall into the screw conveyor 2, in which they are further mixed with sodium silicate water solution or with potassium silicate water solution, brought from the feeder 3, in proportion 2:1. This two step process has its justification, because the sodium tetra boron and sodium hydroxide reduce the surface tension and make the further soaking of the material with sodium silicate water solution or with potassium silicate water solution easier. When asbestos blankets or cords are conversed, it is enough to mix their crushed particles only during the transport phase in the screw conveyor 2, with sodium silicate water solution or with potassium silicate water solution in proportions of about 3:1. In case of conversion of asbestos-gypsum plates, the crushed material is mixed inside the crusher 1 with sodium hydroxide and with sodium silicate water solution brought from the feeder 3 in proportions of about 2:1. Next, wet particles of material are introduced into the reactor 4 by means of conveyor 2. After filling reactor 4 heating chamber 9 with properly wetted material, the heating process begins at temperatures from about 900° C. up to about 1,100° C. The heating of the material takes place following the action of many polarized beams of strongly concentrated electromagnetic radiation, in microwave frequency band of about 2.45 GHz or about 915 MHz, created by generators 11 and emitted into the chamber 9 by means of the tube radiators 12. To achieve the full conversion of the fibrous, crystal structure of asbestos into a structure deprived of fibers, particles of cement-asbestos plates are kept in that temperature for about 15 minutes, particles of asbestos-gypsum plates for about 10 minutes, whereas blanket particles and cord particles for about 2 or 3 minutes. As a result of material meltdown its structure takes the form similar to that of pumice-stone, whereas the content of the chamber 9 decreases its original volume and, under the influence of gravity, gradually moves downwards. After the working cycle of the reactor 4 is finished, a disc crusher 17 is activated and it crushes the product of thermal processing and simultaneously cools it down passing it into the containers 18 in the end. With the properly selected capacity of the crusher 1 and the right flow capacity of the conveyor 2, the reactor 4 can work continuously. In the device shown in the FIG. 3, the process of conversion of asbestos materials can similarly proceed in a cyclic order or continuously. After filling the heating chamber 9a of the reactor 4a with wet material, a cyclic process comprising heating the heating chamber 9a content to working temperature, by microwave generators 11 with tube radiators 12 takes place. Moreover the heating chamber 9a is put into a rotary motion, causing the gradual displacement of the heated material moves from the chamber inlet to its outlet. After the assigned time, the heating process ends and thermally modified material is removed outside the chamber 9a. In the outlet part of the reactor 4a housing 10a, the material is crushed and cooled down with the help of fan crusher 17a, and then it is passed to the suitably placed containers 18a. Continuous functioning of this device can be obtained by appropriate adjustment of the capacity of the crusher 1, the flow capacity of the conveyor 2 and the rotary speed of the heating chamber 9a.

It should be noted that the disclosure is not limited to the embodiment described and illustrated as examples. A large variety of modifications have been described and more are part of the knowledge of the person skilled in the art. These and further modifications as well as any replacement by technical equivalents may be added to the description and figures, without leaving the scope of the protection of the disclosure and of the present patent.

What is claimed is:

1. An apparatus for conversion of materials, including asbestos, equipped with a thermal reactor including a heating chamber having at least one microwave generator comprising:
   a crusher for converted material for crushing whole elements containing asbestos;

a screw conveyor for continuously conveying particles of the converted material and mixing the particles with an agent facilitating heating;

a feeder/dispenser of an agent facilitating heating; and a thermal microwave reactor, wherein the feeder/dispenser is connected to at least one of the crusher, the screw conveyor, and the reactor, and the heating chamber is made of microwave radiation non-absorbing material and is located directly at an outlet of the screw conveyor, and the heating chamber is placed in a metal housing, and a microwave generator unit with microwave radiators is fixed to the metal housing, wherein microwave generators are uniformly displaced on a circumference of the metal housing, and the microwave generators further comprise radiators emitting polarized waves, wherein radiators located opposite to each other emit polarized waves with mutually perpendicular polarization in a frequency band of 2.45 GHz or 915 MHz, and both the heating chamber and the metal housing have the form of cylinders situated coaxially, between which an insulating space is created.

2. The apparatus according to claim 1, wherein the feeder/dispenser is attached to the crusher.

3. The apparatus according to claim 1, wherein the feeder/dispenser is attached to the crusher and the screw conveyor.

4. The apparatus according to claim 1, wherein the feeder/dispenser is attached to the screw conveyor.

5. The apparatus according to claim 1, wherein the heating chamber and the metal housing define stationary vertical cylinders.

6. The apparatus according to claim 5, wherein radiators of the generators define a shape of flattened tubes.

7. The apparatus according to claim 1, wherein the crusher is located underneath the heating chamber of the thermal reactor.

8. The apparatus according to claim 1, wherein the heating chamber and the metal housing define horizontal cylinders, and the heating chamber is mounted on rotary bearings in the metal housing and connected to a driving source, and microwave generators are placed along the housing and have radiators emitting polarized waves.

9. The apparatus according to claim 8, wherein the microwave generators are placed along a straight line along the housing.

10. An apparatus for conversion of materials, including asbestos, equipped with a thermal reactor including a heating chamber having at least one microwave generator comprising:

a crusher for converted material for crushing whole elements containing asbestos;

a screw conveyor for continuously conveying particles of the converted material and mixing the particles with an agent facilitating heating;

a feeder/dispenser of an agent facilitating heating; and a thermal microwave reactor, wherein the heating chamber is made of microwave radiation non-absorbing material and is located proximate an outlet of the screw conveyor, and the heating chamber is placed in a housing, and a microwave generator unit with microwave radiators disposed proximate the housing, wherein microwave generators are uniformly displaced on a circumference of the housing, and the microwave generators further comprise radiators emitting polarized waves, wherein radiators located opposite to each other emit polarized waves with mutually perpendicular polarization in a frequency band of 2.45 GHz or 915 MHz, and both the heating chamber and the housing are disposed such that an insulating space is created between the heating chamber and the housing.

11. The apparatus according to claim 10 further comprising microwave generators placed around the housing, the microwave generators further comprising radiators emitting polarized waves, wherein radiators located opposite to each other emit polarized waves with mutually perpendicular polarization.

12. An apparatus for conversion of materials including asbestos, the apparatus comprising:

a first crusher for crushing whole elements of the materials containing asbestos into material particles;

at least one feeder for supplying an agent, the agent being mixed with the material particles to facilitate heating of the material particles;

a thermal reactor including a heating chamber for heating the material particles; and a microwave generator unit with microwave radiators disposed proximate the heating chamber, wherein microwave generators are uniformly displaced on a circumference of the heating chamber, and the microwave generators further comprise radiators emitting polarized waves, wherein radiators located opposite to each other emit polarized waves with mutually perpendicular polarization in a frequency band of 2.45 GHz or 915 MHz.

13. The apparatus according to claim 12, wherein the thermal reactor includes an outer housing and an inner housing disposed inside the outer housing, wherein the inner housing defines the heating chamber.

14. The apparatus according to claim 13, wherein the inner housing includes a microwave radiation non-absorbing material.

15. The apparatus according to claim 13, wherein the outer housing is a metal housing.

16. The apparatus according to claim 13, wherein the thermal reactor defines an insulation space between the inner housing and the outer housing.

17. The apparatus according to claim 13, wherein the heating chamber is a rotary drum.

18. The apparatus according to claim 13, wherein the thermal reactor further includes a plurality of microwave generators disposed along a circumference of the thermal reactor.

19. The apparatus according to claim 18, wherein the plurality of microwave generators each include a microwave radiator including a flattened outlet.

20. The apparatus according to claim 12, further comprising a second crusher disposed at an outlet of the thermal reactor.

* * * * *